(12) United States Patent
Li

(10) Patent No.: US 12,125,005 B2
(45) Date of Patent: Oct. 22, 2024

(54) THIRD-PARTY SETTLEMENT CONTROL METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Xin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 17/483,618

(22) Filed: Sep. 23, 2021

(65) Prior Publication Data

US 2022/0012702 A1    Jan. 13, 2022

Related U.S. Application Data

(63) Continuation of application No. PCT/CN2020/117293, filed on Sep. 24, 2020.

(30) Foreign Application Priority Data

Oct. 24, 2019 (CN) .......................... 201911017021.3

(51) Int. Cl.
   *G06Q 20/08* (2012.01)
   *G06Q 20/02* (2012.01)
   *G06Q 20/40* (2012.01)
(52) U.S. Cl.
   CPC ......... *G06Q 20/0855* (2013.01); *G06Q 20/02* (2013.01); *G06Q 20/407* (2013.01)
(58) Field of Classification Search
   CPC .............. G06Q 20/0855; G06Q 20/02; G06Q 20/407

(Continued)

(56) References Cited

U.S. PATENT DOCUMENTS

2017/0286951 A1    10/2017  Ignatchenko et al.
2017/0295023 A1*   10/2017  Madhavan .............. G06F 21/40
(Continued)

FOREIGN PATENT DOCUMENTS

CN        106874393 A    6/2017
CN        108920257 A    11/2018
(Continued)

OTHER PUBLICATIONS

Tencent Technology, ISR, PCT/CN2020/117293, Dec. 29, 2020, 2 pgs.
Tencent Technology, WO, PCT/CN2020/117293, Dec. 29, 2020, 5 pgs.
(Continued)

*Primary Examiner* — Courtney P Jones
(74) *Attorney, Agent, or Firm* — Morgan, Lewis & Bockius LLP

(57) ABSTRACT

This application relates to a third-party settlement control method performed by a third-party settlement node that is communicatively connected to multiple transaction participant nodes. The method includes: responding, by the third-party settlement node, to a settlement request, and transmitting the settlement request to the transaction participant nodes associated with the settlement request; receiving, by the third-party settlement node, acceptance opinions transmitted by the transaction participant nodes, the acceptance opinion being used for indicating a processing result of the settlement request by each of the transaction participant nodes; and determining, by the third-party settlement node, transaction consensus information according to the received acceptance opinions, and performing a third-party settlement according to the transaction consensus information, the transaction consensus information being used for indicating whether the transaction participant nodes reach a complete consensus on the settlement request.

12 Claims, 9 Drawing Sheets

(58) Field of Classification Search
USPC .......................................................... 705/78
See application file for complete search history.

(56) References Cited

U.S. PATENT DOCUMENTS

| | | | |
|---|---|---|---|
| 2017/0345011 A1 | 11/2017 | Salami et al. | |
| 2019/0253239 A1* | 8/2019 | Shao | G06Q 50/188 |
| 2019/0319938 A1 | 10/2019 | Castinado et al. | |
| 2020/0042996 A1* | 2/2020 | Mayblum | G06Q 20/4016 |
| 2020/0160330 A1* | 5/2020 | Yan | H04L 9/0861 |
| 2020/0286089 A1* | 9/2020 | Cleaver | G06Q 20/401 |
| 2021/0174359 A1* | 6/2021 | Lin | H04L 9/0643 |
| 2021/0342828 A1* | 11/2021 | Magerkurth | H04L 9/3247 |
| 2022/0084031 A1* | 3/2022 | Hou | G06Q 20/3224 |
| 2023/0063172 A1* | 3/2023 | Liberman | G06Q 20/0655 |

FOREIGN PATENT DOCUMENTS

| | | |
|---|---|---|
| CN | 108960837 A | 12/2018 |
| CN | 109064148 A | 12/2018 |
| CN | 109241778 A | 1/2019 |
| CN | 109242453 A | 1/2019 |
| CN | 109559120 A | 4/2019 |
| CN | 110147990 A | 8/2019 |
| CN | 110245522 A | 9/2019 |
| CN | 110866753 A | 3/2020 |
| WO | WO 2019179278 A1 | 9/2019 |

OTHER PUBLICATIONS

Tencent Technology, IPRP, PCT/CN2020/117293, Apr. 26, 2022, 6 pgs.
Extended European Search Report, EP20770930.4, Apr. 11, 2022, 11 pgs.

* cited by examiner

THIRD-PARTY SETTLEMENT CONTROL METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2020/117293, entitled "THIRD-PARTY SETTLEMENT CONTROL METHOD AND APPARATUS, ELECTRONIC DEVICE AND STORAGE MEDIUM" filed on Sep. 24, 2020, which claims priority to Chinese Patent Application No. 201911017021.3, filed with the State Intellectual Property Office of the People's Republic of China on Oct. 24, 2019, and entitled "THIRD-PARTY SETTLEMENT CONTROL METHOD AND APPARATUS, ELECTRONIC DEVICE, AND STORAGE MEDIUM", all of which are incorporated herein by reference in their entirety.

FIELD OF THE TECHNOLOGY

This application relates to the field of computer technologies, and in particular, to blockchain technologies, and provides a third-party settlement control method and apparatus, an electronic device, and a storage medium.

BACKGROUND OF THE DISCLOSURE

For a conventional third-party settlement service, whether it is a consumption settlement or a money transfer, a settlement system generally adopts a distributed transaction solution. The distributed transaction solution treats a payer deduction (including a balance account and a quick settlement) and a payee entry as two independent sub-transactions, which are executed in a specific order. Only after the two sub-transactions succeed, a final state of a transaction is successful; otherwise, the final state of the transaction is failure. A system correspondingly compensates or performs account adjustment according to a cause of the failure. Such orderly-executed approach often takes more time to complete a settlement and is therefore not very efficient for handling complicated transactions.

SUMMARY

Embodiments of this application provide the first third-party settlement control method performed by a third-party settlement node that is communicatively connected to multiple transaction participant nodes, the method comprising:
  responding, by the third-party settlement node, to a settlement request, and transmitting the settlement request to transaction participant nodes associated with the settlement request;
  receiving, by the third-party settlement node, acceptance opinions transmitted by the transaction participant nodes, the acceptance opinion being used for indicating a processing result of the settlement request by each of the transaction participant nodes; and
  determining, by the third-party settlement node, transaction consensus information according to the received acceptance opinions, and performing a third-party settlement according to the transaction consensus information, the transaction consensus information being used for indicating whether the transaction participant nodes reach a complete consensus on the settlement request.

Embodiments of this application provide the second third-party settlement control method applicable to a blockchain network including a third-party settlement node and at least one transaction participant node, the method being performed by an electronic device and including:
  for any transaction participant node, receiving, by the transaction participant node, a settlement request transmitted by a third-party settlement node;
  determining, by the transaction participant node, an acceptance opinion corresponding to the settlement request, the acceptance opinion being used for indicating a processing result of the settlement request by the transaction participant node; and
  transmitting, by the transaction participant node, the acceptance opinion to the third-party settlement node, so that the third-party settlement node determines transaction consensus information according to the acceptance opinion and performs a third-party settlement according to the transaction consensus information, the transaction consensus information being used for indicating whether transaction participant nodes reach a complete consensus on the settlement request.

The embodiments of this application provide an electronic device, including a processor and a memory, the memory storing program code, the program code, when executed by the processor, causing the processor to perform operations of the first third-party settlement control method.

The embodiments of this application provide another electronic device, including a processor and a memory, the memory storing program code, the program code, when executed by the processor, causing the processor to perform operations of the second third-party settlement control method.

The embodiments of this application provide a non-transitory computer-readable storage medium, including program code, when the program code runs on an electronic device, the program code being used for causing the electronic device to perform operations of any one of the foregoing third-party settlement control methods.

Other features and advantages of this application will be described in the subsequent specification, and partially become apparent from this specification, or be understood by implementing this application. Objectives and other advantages of this application may be implemented and obtained by using structures particularly mentioned in this specification, the claims, and the accompanying drawings.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

Figure 1A:
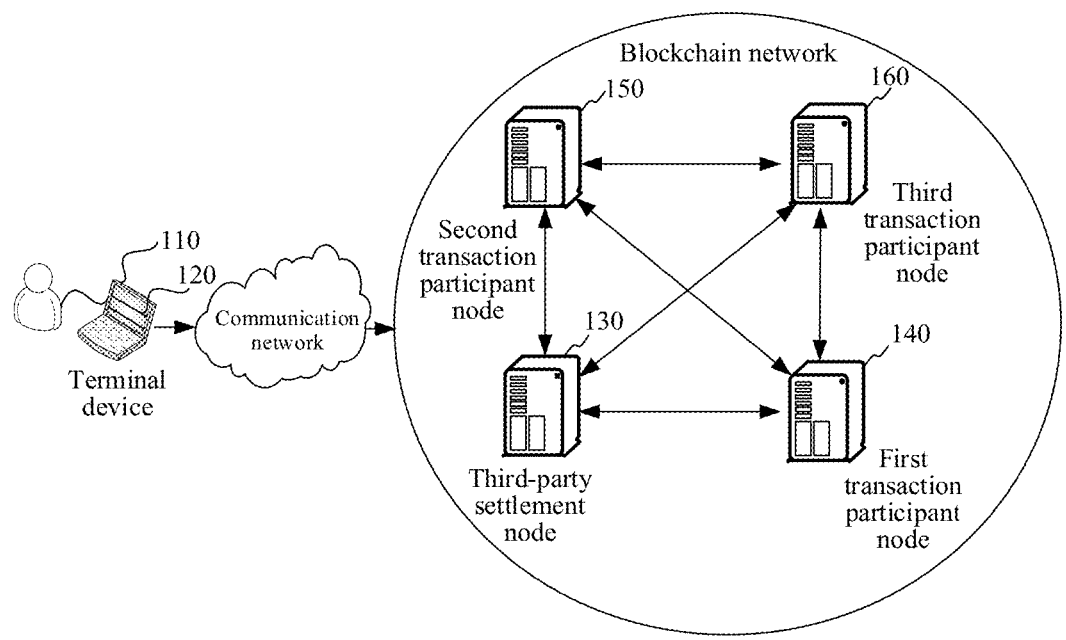
FIG. 1A is a schematic diagram of an application scenario according to an embodiment of this application.

To make the objectives, technical solutions, and advantages of the embodiments of this application clearer, the technical solutions in this application will be clearly and completely described in the following with reference to the accompanying drawings in the embodiments of this application. Apparently, the described embodiments are merely a part rather than all of the embodiments of the technical solutions of this application. All other embodiments obtained by a person of ordinary skill in the art based on the embodiments recorded in the document of this application without creative efforts shall fall within the protection scope of the technical solutions of this application.

The following describes some concepts involved in the embodiments of this application.

1. A distributed ledger is a database that is shared, replicated, and synchronized among network members. Participants in the network restrict and negotiate the update of records in the ledger according to a consensus principle. Each record has a timestamp and a unique cryptographic signature, which makes the ledger an auditable historical record of all transactions in the network.

2. A consensus algorithm is a method that allows all participants to reach a consensus on a common proposal. If all the participants confirm the content of the proposal and reach a final consensus, it is referred to as a complete consensus.

3. A digital signature is a digital string that can only be generated by a sender of information and cannot be forged by others. The digital string is also an effective proof of the authenticity of the information transmitted by the sender. A set of digital signatures generally defines two complementary operations, one for signature and the other for verification.

4. A distributed transaction refers to that participants of the transaction, a server supporting the transaction, a resource server, and a transaction manager are respectively located on different nodes of different distributed systems.

5. A token is actually an intermediary. In a process of a behavior change, an object without a reinforcement effect originally is used as a representation (such as a chip, a copper coin, or a banknote) and is associated with another stimuli (such as food or a toy) that has a reinforcement effect, so that such a representation becomes something with reinforced power. Such a representation that gains reinforced power through a conditioning process is generally referred to as a conditioned reinforcer. A conditioned reinforcer that can be accumulated and exchanged for another reinforcer is referred to as a token.

6. A primary key is one or more fields in a table. A value of the primary key is used for uniquely identifying a record in the table. In a relationship between two tables, the primary key is used for referencing a specific record from the other table in one table. The primary key is a unique key that is a part of a table definition. A primary key of a table may include a plurality of keywords, and columns of the primary key cannot contain any null value.

7. A third-party settlement refers to a network settlement mode in which an independent institution with certain strength and reputation guarantees facilitates a transaction between both parties in the transaction by connecting with UnionPay online. In a third-party settlement mode, after a buyer purchases goods, the buyer settles a payment (settlement is paid to a third party) by using an account provided by a third-party settlement platform, and the third party informs a seller that the payment has been received and requires delivery. The buyer receives and inspects the goods, and after the goods are confirmed, the buyer notifies the third party to pay. The third party then transfers the payment to a seller account.

8. Hyperledger Fabric is a permissioned blockchain infrastructure, which was originally contributed to the Hyperledger project by IBM and Digital Asset. Hyperledger Fabric provides a modular architecture with a delineation of roles between the nodes in the infrastructure, execution of smart contracts (referred to as "chaincode" in Fabric) and configurable consensus and membership services. A Fabric network includes peer nodes that execute chaincode contracts, access ledger data, endorse transactions, and interface with applications. Orderer nodes are responsible for ensuring the consistency of the blockchain and delivering endorsed transactions to peers in the network. Membership service providers (MSPs), as certificate authorities, mainly manage X.509 certificates which are used for authenticating member identities and roles.

The following describes the embodiments of this application with reference to the accompanying drawings of this specification. It is to be understood that the embodiments described herein are merely used for illustrating and explaining this application, but are not intended to limit this application. In addition, the embodiments of this application and features in the embodiments may be mutually combined in a case of no conflict.

Because a conventional third-party settlement service requires orderly execution of sub-transactions, and generally does not support calling an external system in sub-transactions, or in other words, only conditionally calls an external system in the first sub-transaction, for example, calls a quick settlement deduction. When there are more than two transaction participant nodes, scenarios in which an external system needs to be called increase accordingly. Therefore, a larger quantity of sub-transactions needs to be supported, and any sub-transaction can call an external system. In addition, the orderly execution of the sub-transactions results in increased transaction time, and system processing efficiency is not high.

A blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block.

In a blockchain system, each node needs to keep its own ledger consistent with a ledger of other nodes. In the blockchain system, how to make each node keep data consistent according to a rule is a core problem. The solution to this problem is to develop a consensus algorithm. The consensus algorithm is actually a rule, and each node needs to confirm its own data according to this rule.

At present, there are open source implementations of general distributed ledgers, for example, Hyperledger Fabric, which mainly uses a technology stack of the blockchain and introduces a variety of consensus algorithms, to decentrally achieve the consistency of ledger data when a quantity of replica nodes of the ledger is uncertain. A consensus process of the general distributed ledger technology is regarded as a transaction and does not involve sub-transactions.

The distributed ledger technology in the embodiments of this application is mainly applied to settlement scenarios, for example, third-party token consumption settlement and clearing and settlement services, which are similar to existing third-party settlement services. A main difference is that tokens are used as a settlement tool, rather than directly settled in RMB.

For each settlement transaction of a third-party settlement node, there are at least three participant nodes: a token issuer node; a payer node, for example, a user node; and a payee node, for example, a merchant node. If a token settlement is a single settlement, that is, a transaction amount is entirely composed of a token amount, which is similar to an exchange of bank credit card points, a bank as a token issuer needs to check whether to support a merchant transaction by transaction, that is, a service provider or a commodity supplier. The merchant also needs to check whether to accept such tokens as a settlement tool transaction by transaction. In a case of a combined settlement, that is, part of the transaction amount is settled by using tokens, a service rule of the combined settlement may be more complicated than a single settlement. For example, there may be an upper or lower limit on an amount of a single transaction, or there may be an upper or lower limit on a proportion of an amount deducted by tokens. For each token, even the same issuer may adopt different service rules for different merchants. Therefore, the third-party settlement node needs to support the docking with service systems of the token issuer and the merchant. Even if the node provides a general and standardized service rule configuration system, taking into account the decoupling of the system, the docking of the configuration system and the settlement node is similar to the docking of the settlement node and an external system.

Moreover, there are a limited quantity of transaction participant nodes. Even in a relatively complex consumer settlement scenario, for example, a combined settlement, that is, a combination of any two or more settlement manners for non-fixed proportion settlements, there are generally no more than three settlement payers. From the scenario in which the third-party settlement node clears directly to multi-parties, it can be seen that there are also generally no more than three payees. Therefore, the open source implementation of distributed ledgers is not only an over-design, but also directly affects the implementation of an existing account core system of the third-party settlement node.

In view of this, the technical solutions in the embodiments of this application introduce sub-transactions and a complete consensus. All transaction participant nodes participate in reaching a consensus. In addition, the sub-transactions are computed in parallel in the embodiments of this application, thereby improving system efficiency, and achieving final consistency of data. The technical solutions provided by the embodiments of this application is a distributed ledger technology that is provided by a third-party settlement node and implements that participant nodes of a settlement transaction reach a "complete consensus" on the transaction and independently record a consensus reaching process.

FIG. 1A is a schematic diagram of an optional application scenario according to an embodiment of this application. The diagram of this application scenario includes a terminal device 110, a third-party settlement node 130, a first transaction participant node 140, and a second transaction participant node 150, and a third transaction participant node 160. A user may log in to a settlement page 120 by using the terminal device 110 to request a transaction settlement. In response to a settlement request of the user, the third-party settlement node 130 transmits a settlement request to the first transaction participant node 140, the second transaction participant node 150, and the third transaction participant node 160. After receiving the settlement request transmitted by the third-party settlement node 130, any one of the first transaction participant node 140, the second transaction participant node 150, and the third transaction participant node 160 determines an acceptance opinion for the settlement request, and transmits the acceptance opinion to the third-party settlement node 130. The third-party settlement node 130 determines transaction consensus information according to the received acceptance opinion returned by the first transaction participant node 140, the second transaction participant node 150, and the third transaction participant node 160, and processes a transaction according to the transaction consensus information. The third-party settlement node 130 can communicate with the first transaction participant node 140, the second transaction participant node 150, and the third transaction participant node 160 by using a communication network.

The third-party settlement node 130, the first transaction participant node 140, the second transaction participant node 150, and the third transaction participant node 160 form a blockchain-based data sharing system. The foregoing nodes may receive input data during normal operation, and maintain shared data in the data sharing system based on the received input information. To ensure information interoperability in the data sharing system, there may be an information connection among the third-party settlement node 130, the first transaction participant node 140, the second transaction participant node 150, and the third transaction participant node 160, and information transmission may be performed between the nodes by using the above information connection. For example, when the third-party settlement node 130 receives the settlement request, the first transaction participant node 140, the second transaction participant node 150, and the third transaction participant node 160 may obtain the settlement request according to a consensus algorithm, and store the settlement request as data in the shared data, so that data stored on all nodes in the data sharing system is consistent.

All the foregoing four nodes have node identifiers respectively corresponding to the nodes, and each of the nodes may store a node identifier of another node in the data sharing system, to broadcast a generated block to the another node in the data sharing system according to the node identifier of the another node subsequently. The each node may maintain a node identifier list shown in the following table, and correspondingly store node names and node identifiers in the node identifier list. The node identifier may be an Internet Protocol (IP) address and any other type of information that can be used for identifying the node. Table 1 only uses the IP address as an example for description.

TABLE 1

| Node name | Node identifier |
| --- | --- |
| Third-party settlement node 130 | 117.114.151.174 |
| First transaction participant node 140 | 117.116.189.145 |
| Second transaction participant node 150 | 117.118.198.154 |
| Third transaction participant node 160 | 119.123.789.258 |

In addition, the third-party settlement node 130, the first transaction participant node 140, the second transaction participant node 150, and the third transaction participant node 160 all store the same blockchain.

Descriptions are made below in detail by using a token settlement between nodes as an example. There are many application scenarios of token settlements, including: offline scenarios such as common game coins and supermarket prepaid card consumption; and online scenarios, such as credit card points exchanged for commodities, Tao gold coins exchanged for commodities; third-party settlement nodes, such as various international general integral platforms. A third-party settlement platform is built to allow issuers to issue tokens according to their own services, and users obtain tokens through online and offline activities or exchange RMB for tokens, and may use the tokens for consumption at a designated merchant according to a token usage service rule. The third-party settlement node completes a settlement of the tokens held by the merchant to RMB.

Descriptions are made below in detail by using a token settlement scenario as an example. Transaction participant nodes in this scenario include: a user node, a token issuer node, and a merchant node. Corresponding distributed ledgers include four ledgers, namely a third-party settlement ledger, a user ledger, a token issuer ledger, and a merchant ledger. Such ledgers are implemented by using a blockchain, and ledger information is recorded in blocks of the blockchain.

Figure 1B:
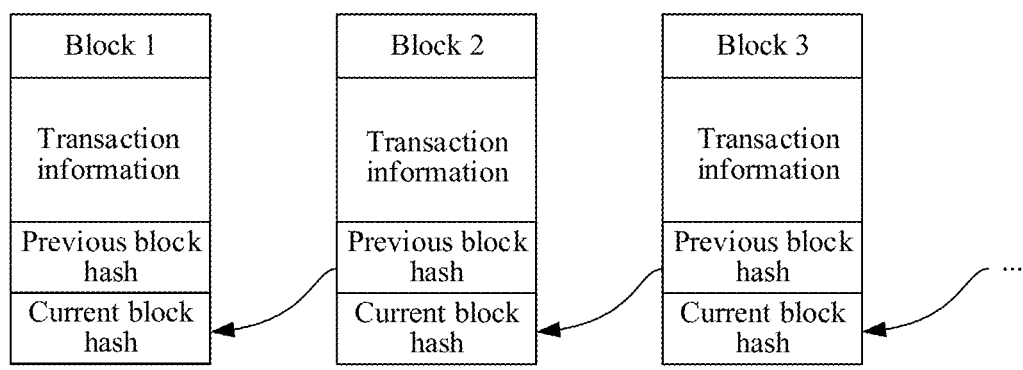
FIG. 1B is an optional schematic diagram of a blockchain structure according to an embodiment of this application.

FIG. 1B is an optional schematic diagram of a block structure according to an embodiment of this application. The blockchain shown in FIG. 1B includes a series of blocks that are consecutive in a chronological order of generation. Each block includes a hash value of a transaction record stored in a current block (a hash value of the current block) and a hash value of a previous block. The blocks are connected according to hash values to form the blockchain. In addition, the block may further include information such as a timestamp indicating a block generation time. Once a new block is added to the blockchain, the block is not removed. The block records the record data submitted by the user node, the token issuer node, the merchant node, the third-party settlement node, and the like. Specific record data refers to transaction information in a third-party settlement process, for example, a settlement request, an acceptance opinion, feedback information, or transaction consensus information.

The third-party settlement node and the user node are generally implemented by a third-party settlement platform in a unified manner. According to the complexity of a service rule of each token and a standardization degree of the token, the merchant node and the token issuer node may be implemented by the third-party settlement platform in a unified manner or may dock with an external service system.

In this embodiment of this application, when a payer node requests a settlement transaction, the third-party settlement node responds to the settlement request, records the settlement request, and transmits the settlement request to each transaction participant node involved in the settlement transaction.

An example in which the settlement request is a token settlement request initiated by the user is used.

Figure 2:
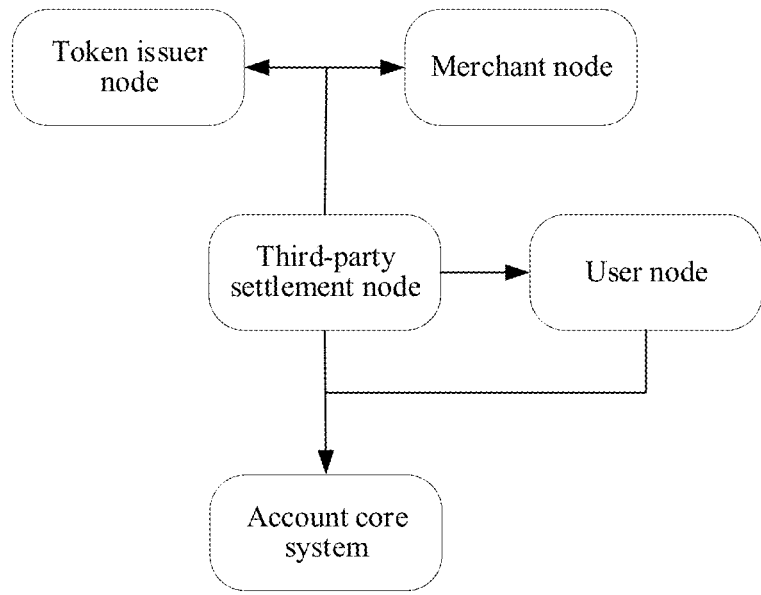
FIG. 2 is an optional schematic diagram of a third-party settlement according to an embodiment of this application.
Figure 3:
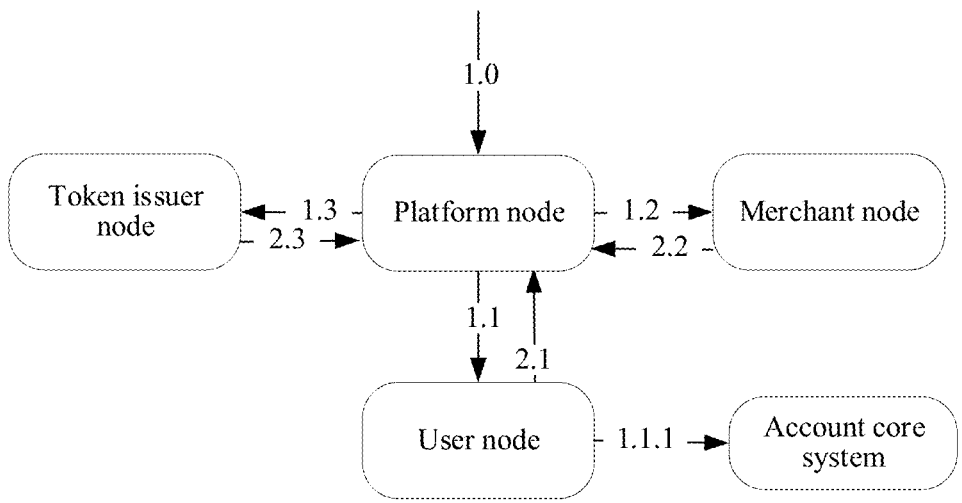
FIG. 3 is another optional schematic diagram of a third-party settlement according to an embodiment of this application.

FIG. 2 is an optional schematic diagram of a third-party settlement according to an embodiment of this application. FIG. 3 is another optional schematic diagram of a third-party settlement according to an embodiment of this application. As shown in FIG. 3, the third-party settlement node (that is, a platform node in the figure) responds to a token settlement request (1.0) of the user, records the token settlement request in a ledger, and then transmits in parallel a settlement request (1.1) to the user node, transmits a settlement request (1.2) to the merchant node, transmits a settlement request (1.3) to the token issuer node.

It is to be noted that although the token settlement request numbers are different, token settlement request messages are the same, which are all generated based on a current transaction element and digitally signed by the third-party settlement node without additional reliance on other information. The digital signature technology based on a private key of respective certificate is used to ensure that an acceptance opinion generated by each transaction participant node is true and credible. In addition, when the third-party settlement node forwards the acceptance opinion, an original signature is also retained.

Specific content included in transaction elements depends on a service scenario. Using a representative token settlement scenario as an example, the transaction elements include but are not limited to a token type, a payee, a payer, a token settlement amount, or the like.

In this embodiment of this application, after receiving the settlement request, the each transaction participant node records the settlement request and generates an acceptance opinion based on the current transaction element. The acceptance opinion indicates whether the transaction participant node agrees to the token settlement request.

In this embodiment of this application, the acceptance opinion mainly includes transaction willingness, a settlement amount, or the like. The transaction willingness may be expressed as allowing a transaction, disallowing a transaction, or the like.

Given that the user is an initiator of a token settlement, after the token settlement request is received, processing manners of the user node, the merchant node, and the token issuer node are different. Descriptions are made below in detail for different transaction participant nodes by using FIG. 3 as an example.

1. The Transaction Participant Node is the User Node.

In this embodiment of this application, because the user is the initiator of the token settlement, the user node does not have additional service logic verification, directly records the token settlement request (1.1) in the user ledger, and then calls an account core system to freeze tokens required for the settlement (1.1.1). The user node determines an acceptance opinion (2.1) according to a freezing result, and finally transmits an acceptance opinion message to the third-party settlement node.

Specifically, if the freezing is successful, an acceptance opinion of "allowing a transaction" is recorded and digital signature is performed. If the freezing fails, an acceptance opinion of "disallowing a transaction" and a reason for the failure are recorded, and digital signature is performed.

2. The Transaction Participant Node is the Merchant Node.

In this embodiment of this application, the merchant node records the received token settlement request (1.2) in the merchant account book, and then performs corresponding service logic verification according to a token type. Verification content depends on a specific merchant service rule. The merchant node determines an acceptance opinion (2.2) according to a verification result, and finally transmits an acceptance opinion message to the third-party settlement node.

Specifically, if the service rule is met, an acceptance opinion of "allowing a transaction" is recorded and digital signature is performed; otherwise, an acceptance opinion of "disallowing a transaction" and a reason for the failure are recorded, and digital signature is performed.

3. The Transaction Participant Node is the Token Issuer Node.

In this embodiment of this application, when the transaction participant node is the token issuer node, the processing of the token issuer node is similar to that of the merchant node, and a main difference is that respective service rules are different. The received token settlement request (1.3) is recorded in the token issuer ledger, and corresponding service logic verification is then performed according to a token type. Verification content depends on a specific merchant service rule. The token issuer node determines an acceptance opinion (2.3) according to a verification result, and finally transmits an acceptance opinion message to the third-party settlement node.

For example, the token issuer node needs to determine whether the merchant is a merchant that has token consumption authorization. That is, whether the merchant can receive such tokens. The merchant needs to determine whether the merchant has gained the authorization of consumption of such tokens. In addition, there are also differences in respective service rules. Similarly, the token issuer node needs to transmit the acceptance opinion message to the third-party settlement node after recording.

The third-party settlement node and the user node rely on an account core system of a conventional third-party settlement system.

Figure 4:
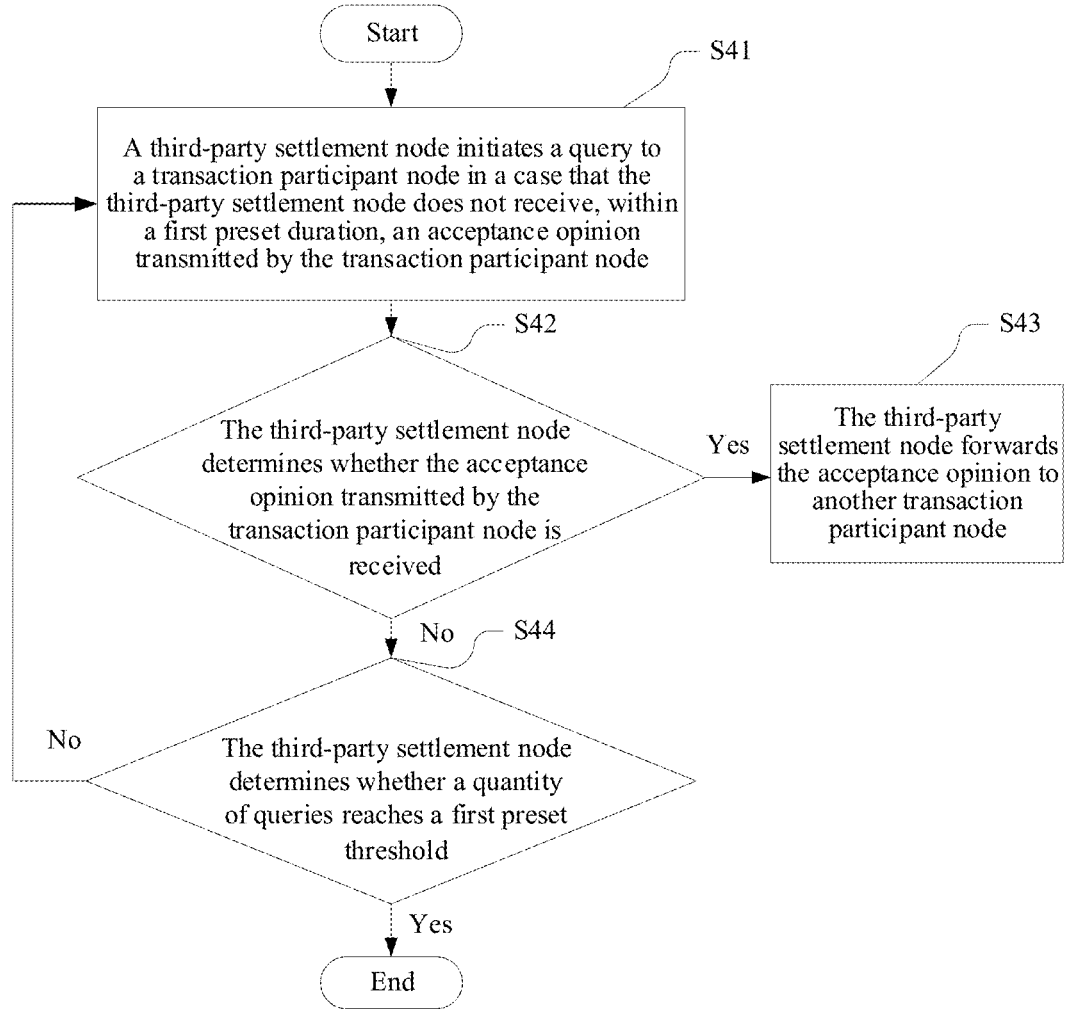
FIG. 4 is an optional schematic flowchart of querying an acceptance opinion according to an embodiment of this application.

In an optional implementation, after transmitting the settlement request to the transaction participant nodes, the third-party settlement node periodically initiates, for any transaction participant node, a query to the transaction participant node when the third-party settlement node does not receive, within a first preset duration, an acceptance opinion transmitted by the transaction participant node, until the acceptance opinion transmitted by the transaction participant node is received or a quantity of queries reaches a first preset threshold. As shown in FIG. 4, a specific process includes the following steps.

Step S41: The third-party settlement node initiates a query to the transaction participant node when the third-party settlement node does not receive, within the first preset duration, the acceptance opinion transmitted by the transaction participant node.

Step S42: The third-party settlement node determines whether the acceptance opinion transmitted by the transaction participant node is received; if yes, performs step S43; otherwise, performs step S44.

Step S43: The third-party settlement node forwards the acceptance opinion to another transaction participant node.

Step S44: The third-party settlement node determines whether the quantity of queries reaches the first preset threshold; if yes, ends the process; otherwise, returns to step S41.

Both the first preset duration and the first preset threshold may be configured according to specific conditions.

For example, the first preset duration is 30 seconds, and the first preset threshold is 3. Assuming that the third-party settlement node still does not receive, within 1 minute after transmitting the token settlement request to the user node, an acceptance opinion returned by the user node, it is determined that the user node fails to generate the acceptance opinion in a timely manner, and the third-party settlement node initiates a query to the user node. If the third-party settlement node initiates a query for 3 times and does not receive the acceptance opinion, the third-party settlement node records that the user node does not feedback the acceptance opinion, and then broadcasts a result to the merchant node and the token issuer node.

Broadcasting the result is to keep data of the third-party settlement node, the merchant node, and the token issuer node consistent, and the third-party settlement node, the merchant node, and the token issuer node record the acceptance opinion of the user node as timeout. The merchant node and the token issuer node also need to transmit feedback information in a case of receiving the broadcast, to notify the third-party settlement node that the merchant node and the token issuer node have received the broadcast.

In this embodiment of this application, the feedback information is to ensure the integrity of data communication. After receiving information broadcasted or forwarded by the third-party settlement node, each transaction participant node may transmit feedback information to the third-party settlement node, which is irrelevant to broadcasted content or forwarded content.

In this embodiment of this application, after receiving the acceptance opinion of the transaction participant node, the third-party settlement node forwards the acceptance opinion to another transaction participant node, that is, "broadcasts" an acceptance opinion of each transaction participant node.

For example, after receiving the acceptance opinion (2.1) of the user node, the third-party settlement node first records the acceptance opinion in the third-party settlement ledger, and then forwards the acceptance opinion (2.1) to the merchant node and the token issuer node in parallel. After receiving the acceptance opinion (2.2) of the merchant node, the third-party settlement node first records the acceptance opinion in the third-party settlement ledger, and then forwards the acceptance opinion (2.2) to the user node and the token issuer node. After receiving the acceptance opinion (2.3) of the token issuer node, the third-party settlement node first records the acceptance opinion in the third-party settlement ledger, and then forwards the acceptance opinion (2.3) to the merchant node and the user node.

In this embodiment of this application, a transaction participant node needs to return feedback information to the third-party settlement node after receiving an acceptance opinion of another transaction participant node that is broadcasted by the third-party settlement node. The feedback information is used for indicating whether the transaction participant node receives the acceptance opinion broadcasted by the third-party settlement node.

In an example in which the third-party settlement node receives the acceptance opinion message transmitted by the user node, the third-party settlement node first records an acceptance opinion, and then forwards the acceptance opinion to the merchant node and the token issuer node in parallel. The merchant node records the acceptance opinion in the merchant ledger, and the token issuer node records the acceptance opinion in the token issuer ledger. The merchant node and the token issuer node then transmit feedback information to notify the third-party settlement node, and the third-party settlement node records feedback.

There is no need to determine whether the merchant node and the token issuer node have generated respective acceptance opinions for the forwarding of the acceptance opinion message, and the forwarding of the acceptance opinion message is only a "broadcasted" notification of the acceptance opinion of the user node.

Figure 5:
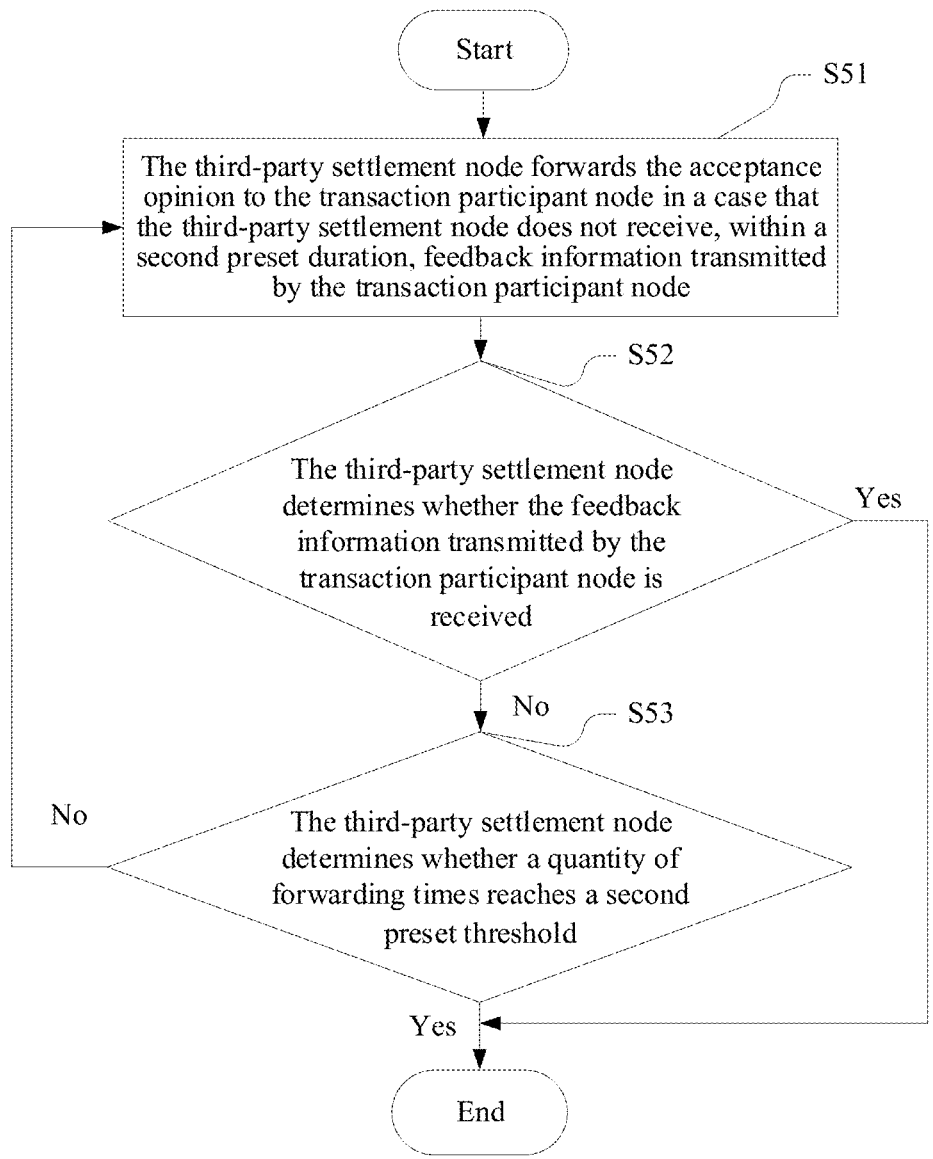
FIG. 5 is another optional schematic flowchart of forwarding an acceptance opinion according to an embodiment of this application.

In an optional implementation, after forwarding an acceptance opinion transmitted by any transaction participant node to another transaction participant node, the third-party settlement node periodically forwards, for the another transaction participant node, the acceptance opinion to the transaction participant node when the third-party settlement node does not receive, within a second preset duration, feedback information transmitted by the transaction participant node, until the feedback information transmitted by the transaction participant node is received or a quantity of forwarding times reaches a second preset threshold. A specific process includes the following steps shown in FIG. 5.

Step S51: The third-party settlement node forwards the acceptance opinion to the transaction participant node when the third-party settlement node does not receive, within the second preset duration, the feedback information transmitted by the transaction participant node.

Step S52: The third-party settlement node determines whether the feedback information transmitted by the transaction participant node is received; if yes, ends the process; otherwise, performs step S53.

Step S53: The third-party settlement node determines whether the quantity of forwarding times reaches the second preset threshold; if yes, ends the process; otherwise, returns to step S51.

The second preset duration and the second preset threshold may be set according to an actual case.

Assuming that the second preset duration is 40 seconds and the second preset threshold is 3, if the merchant node receives the acceptance opinion of the user node that is broadcasted by the third-party settlement node, and does not transmit feedback information to the third-party settlement node in a timely manner, the third-party settlement node forwards the acceptance opinion of the user node to the merchant node again, and stops forwarding until the third-party settlement node receives the feedback information of the merchant node or a quantity of forwarding times reaches 3 times. Once such an abnormal response occurs, the third-party settlement node starts a background notification mechanism and periodically initiates notifications to the merchant node until a counterpart node (that is, the merchant node) feeds back normally.

In this embodiment of this application, after receiving acceptance opinions of the transaction participant nodes, the third-party settlement node synthesizes the acceptance opinions of all the participant nodes to determine transaction consensus information and forms the transaction consensus information.

When the third-party settlement node synthesizes the received acceptance opinions of all the participant nodes to determine the transaction consensus information, it may be divided into the following cases:

Case 1: It is determined that the transaction consensus information is a transaction success when the third-party settlement node receives the acceptance opinions of all the transaction participant nodes and all the acceptance opinions are allowing a transaction.

For example, the third-party settlement node counts the received acceptance opinions of all the transaction participant nodes. The user node, the merchant node, and the token issuer node all feedback the acceptance opinions, and the acceptance opinions are all allowing a transaction, a consensus of a transaction success is reached, and the transaction consensus information is a transaction success.

Case 2: It is determined that the transaction consensus information is a transaction failure when the third-party settlement node receives the acceptance opinions of all the transaction participant nodes and at least one acceptance opinion is disallowing a transaction.

For example, the third-party settlement node counts the received acceptance opinions of all the transaction participant nodes. The user node, the merchant node, and the token issuer node all feedback the acceptance opinions. However, because a current token amount of a user is less than a token amount required for a settlement, and the acceptance opinion of the user node is disallowing a transaction, a consensus of a transaction failure is reached, and the transaction consensus information is a transaction failure.

Case 3: It is determined that the transaction consensus information is a transaction failure when the third-party settlement node does not receive an acceptance opinion of any transaction participant node.

For example, the third-party settlement node counts the received acceptance opinions of all the transaction participant nodes. Both the merchant node and the token issuer node feedback the acceptance opinions. However, because the user node does not feedback an acceptance opinion, a consensus of a transaction failure is reached, and the transaction consensus information is a transaction failure.

Similarly, after receiving the acceptance opinion of another transaction participant node that is broadcasted by the third-party settlement node, each transaction participant node synthesizes the acceptance opinion by using the same logic, and obtains final transaction consensus information. The transaction consensus information of the transaction participant nodes is finally consistent without an additional negotiation of the transaction consensus information.

In this embodiment of this application, if a transaction participant node lacks an acceptance opinion of another transaction participant node on the transaction, the node does not reach a consensus on the transaction temporarily, and until the node obtains the acceptance opinion of the another transaction participant node from the third-party settlement node, the transaction consensus is still consistent with the third-party settlement node.

For example, if the user node does not receive the acceptance opinions returned by the merchant node and the token issuer node to the third-party settlement node, the user node does not reach a consensus on the transaction temporarily. Until the user node receives the acceptance opinion (2.2) of the merchant node and the acceptance opinion (2.3) of the token issuer node from the third-party settlement node, the user node determines the transaction consensus information according to the acceptance opinion (2.1) of the user node, the acceptance opinion (2.2) of the merchant node, and the acceptance opinion (2.3) of the token issuer node.

Assuming the acceptance opinion (2.1), the acceptance opinion (2.2), and the acceptance opinion (2.3) are all allowing a transaction, the user node may determine that the transaction consensus information is a transaction success. Assuming that in the acceptance opinion (2.1), the acceptance opinion (2.2), and the acceptance opinion (2.3), the acceptance opinion (2.3) is disallowing a transaction, the user node may determine that the transaction consensus information is a transaction failure.

Similarly, the merchant node and the token issuer node also determine the transaction consensus information in the same manner, and repetitions are not described herein again.

It is to be noted that when the acceptance opinions of the transaction participant nodes are synthesized to determine the transaction consensus information in this embodiment of this application, the timeout of feedback information of an acceptance opinion notification is not considered, because it does not affect the transaction consensus information of the third-party settlement node.

Data of the four ledgers (that is, the user ledger, the merchant ledger, the token issuer ledger, and the third-party settlement ledger) in the foregoing embodiment is consistent other than data that an acceptance opinion is not fed back in a timely manner. Data of the third-party settlement ledger of the third-party settlement node is consistent with ledger data that is not timed out, and transaction consensuses reached thereof are also consistent. That is, if any node fails to feedback an acceptance opinion in a timely manner, transaction consensuses of other transaction participant nodes are a transaction failure, which are also consistent.

In this embodiment of this application, after determining the transaction consensus information, the third-party settlement node performs accounting according to the transaction consensus information, and in this case, the third-party settlement node may call the account core system.

That the third-party settlement node calls the account core system according to the transaction consensus information may be specifically classified into the following two cases:

Case 1: The Transaction is Successful.

In this case, the third-party settlement node calls the account core system to deduct a frozen token amount of the transaction in a user account, and then calls the account core system to entry a corresponding token amount into a merchant account.

For example, a user A requests to exchange points for a commodity A, and the transaction requires 1,000 points. If transaction consensus information is a transaction success, the third-party settlement node calls the account core system to deduct 1,000 points in an account of the user A, and then calls the account core system to entry 1,000 points into a merchant account.

Case 2: The Transaction Fails.

In this case, the third-party settlement node calls the account core system to lift a freeze of a token amount of the transaction in a user account.

For example, a user B requests to exchange points for a commodity B, and the transaction requires 1,000 points. If transaction consensus information is a transaction failure, the third-party settlement node calls the account core system to unfreeze 1,000 points frozen before in an account of the user B.

In this embodiment of this application, a transaction consensus of the third-party settlement node cannot be changed. The third-party settlement node calls the account core system to change account funds according to a finally reached transaction consensus. Whether the account funds change is successful or not does not affect the transaction consensus. If an extreme case such as a failure occurs in the foregoing operations such as a deduction, unfreezing, and an entry, offline account adjustment may be introduced subsequently, so that data of the account core system is consistent with the transaction consensus, which is similar to conventional third-party settlement reconciliation and account adjustment mechanisms, to achieve an expected or prescribed result of accounts. Details are not described herein again.

In this embodiment of this application, a point-to-point communication network between the third-party settlement node and each transaction participant node is established by using the third-party settlement node as a network hub, to perform data exchange with other three nodes. That is, the nodes initiate a call to a docking system. Therefore, a distributed ledger is not decentralized, which is also in line with a real service scenario. The user is a user of the third-party settlement node, and the merchant is a merchant of the third-party settlement node. The user makes a settlement for consumption to the merchant through the third-party settlement node. Therefore, the third-party settlement node is also an entity that docks with a service system on a token issuer side and a service system on a merchant side. In this application, the node initiates a call to a docking system. The authenticity of ledger data interaction is guaranteed through a digital signature of a data producer. All ledger data are transmitted to other nodes by using the third-party settlement node, and transaction participant nodes separately calculate a final transaction result according to acceptance opinions. That is, for any transaction, data of four ledger copies is finally completely consistent, and final transaction results in the ledgers calculated based on the data are also consistent.

In addition, taking into account the ledger data recorded in this embodiment of this application has a chronological order, in each ledger, an acceptance opinion of the ledger on a transaction is first recorded, and a received acceptance opinion of another transaction participant node is then recorded. Therefore, merely in terms of a chronological order, the substance of the data is consistent, but sequences of data recording may be inconsistent. Therefore, in order to ensure that step S51 is implemented according to the flowchart shown in FIG. 5, the method provided in this embodiment of this application further includes the following step: recording the ledger data after the ledger data is sorted in a primary key order, in order to make the expression that the data of the four ledgers is finally completely consistent more rigorous.

An optional primary key sequence is: a transaction identity (ID) and a participant node ID. After the ledger data is sorted in this manner, it can be ensured that the data of the ledgers is completely consistent from content to substance.

Based on the above, the third-party settlement solution in this embodiment of this application can support more complex settlement service rules:

1. A combined settlement scenario, such as the token settlement described in the foregoing, which has a more complex service rule inherently, and therefore introduces more external service system docking; and
2. A multi-party clearing scenario. To reduce secondary clearing scenarios, it is necessary for the third-party settlement node to directly clear to a terminal merchant. Through the solution, a transaction participant node in the clearing can calculate clearing results transaction by transaction, and after a consensus is reached on the clearing results, the third-party settlement node performs subsequent clearing and settlement.

In addition, a transaction acceptance process in this embodiment of this application is more efficient, clear, open, and traceable. A consensus process is clear and final consistency is guaranteed. For any transaction, ledger data of all transaction participant nodes is the same. Unless process data of reaching a consensus on the transaction in ledgers of all the transaction participant nodes is changed, the tampering is unsuccessful. The ledger of any party can trace all data of a recorded transaction.

In this embodiment of this application, data storage may be implemented by using a conventional database, which also facilitates sharding to support concurrency, in addition to maturity, stability, reliability, and ease of use of a database product.

An optional implementation is that transaction data is recorded by adopting a master-detail table design. A transaction table records main transaction information and transaction consensus information, and a flow table records process data that participant nodes reach a consensus. As shown below, main field examples of an optional table are described.

1. Fields in the transaction table include but are not limited to fields in structured query language (SQL) statements as follows:
CREATE TABLE [database name].[transaction table name] (
'Fid' int(11) NOT NULL AUTO_INCREMENT,
'Forder_id' varchar(64) NOT NULL COMMENT 'transaction ID',
'Ftoken_type' int(5) NOT NULL COMMENT 'token type',
'Forder_payer' varchar(64) NOT NULL COMMENT 'user ID of payer',
'Forder_merchant' varchar(64) NOT NULL COMMENT 'merchant ID of payee',
'Ftoken_issuer' varchar(64) NOT NULL COMMENT 'token issuer ID',
'Ftoken_amount' int(11) NOT NULL COMMENT 'token settlement amount',
'Forder_amount' int(11) COMMENT 'order amount in RMB',
'Ftoken_settle_amount' int(11) COMMENT token settlement amount in RMB',
'Fstatus' int(1) NOT NULL COMMENT 'transaction status',
'Fcreate_time' DATETIME NOT NULL COMMENT 'creation time',
'Fmodify_time' DATETIME NOT NULL COMMENT 'update time',
PRIMARY KEY ('Fid'),
UNIQUE KEY 'idx_order_id' ('Forder_id'),
KEY 'idx_modify_time' ('Fmodify_time'),
)ENGINE=InnoDB DEFAULT CHARSET=utf8 COMMENT 'token settlement transaction table'

2. Fields in the flow table include but are not limited to fields in SQL statements as follows:
CREATE TABLE [database name].[flow table name] (
'Fid' int(11) NOT NULL AUTO_INCREMENT,
'Forder_id' varchar(64) NOT NULL COMMENT 'transaction ID',
'Frule' int(1) NOT NULL COMMENT 'role, 1-user, 2-merchant, 3-token issuer party',
'Freq_type' int(1) NOT NULL COMMENT 'request type, 1-acceptance willingness, 2-forwarding',
'Freq_msg' varchar(1024) NOT NULL COMMENT 'request content',
'Freq_msg_sign' varchar(1024) NOT NULL COMMENT 'request signature',
'Freq_time' DATETIME NOT NULL COMMENT 'transmission time',
'Fresp_msg' varchar(256) COMMENT 'response content',
'Fresp_msg_sign' varchar(1024) COMMENT 'response signature',
'Fresp_time' DATETIME COMMENT 'feedback time',
'Fcreate_time' DATETIME NOT NULL COMMENT 'creation time',
'Fmodify_time' DATETIME NOT NULL COMMENT 'update time',
PRIMARY KEY ('Fid'),
UNIQUE KEY 'idx_req_id' ('Forder_id', 'Frule', 'Freq_type'),
KEY 'idx_modify_time' ('Fmodify_time')
)ENGINE=InnoDB DEFAULT CHARSET=utf8 COMMENT 'consensus flow table'

In the foregoing design example, still using the user node as an example, when Freq_type is equal to 1, Freq_msg is a settlement request transmitted by the third-party settlement node to the user node. An encoding or serialization solution of Freq_msg may be selected according to an actual situation. However, the same encoding or serialization solution may be preferably selected for all the nodes. A field Freq_msg_sign is a digital signature of the third-party settlement node on a field value of Freq_msg. Fresp_msg is an acceptance opinion generated by the user node, and it is recommended that an encoding or serialization solution of Fresp_msg be the same as Freq_msg. A field Fresp_msg_sign is a digital signature of the user node on a field value of Fresp_msg. Lengths of the foregoing text fields are related to content elements, serialization solutions, certificate key lengths, digest algorithms, and the like, depending on a specific selected solution. For scalability, a text field type provided by the database may be also considered, for example, a Clob type provided by Oracle, or a text type provided by Mysql.

Figure 6:
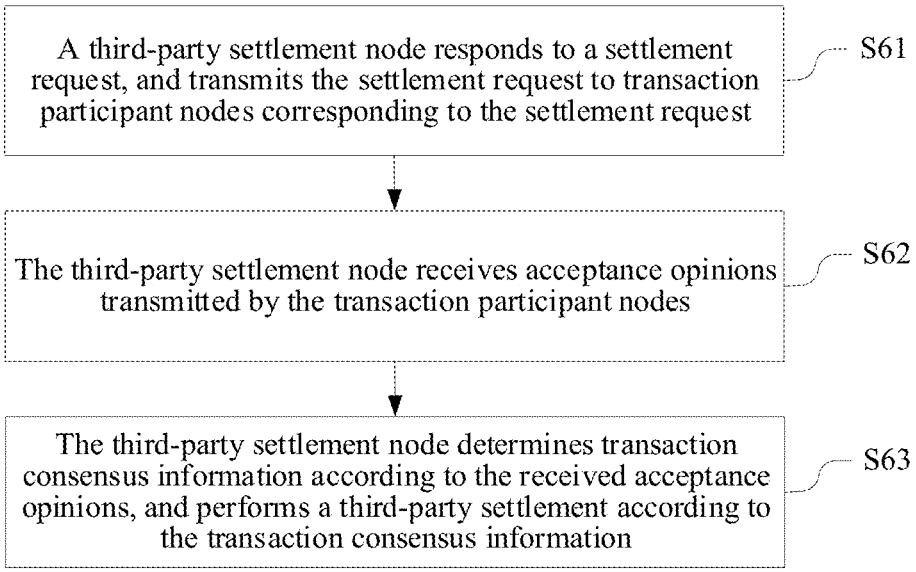
FIG. 6 is an optional schematic flowchart of a third-party settlement control method according to an embodiment of this application.

FIG. 6 is an implementation flowchart of a third-party settlement control method according to an embodiment of this application. A specific implementation process of the method includes the following steps.

Step S61: A third-party settlement node responds to a settlement request, and transmits the settlement request to transaction participant nodes associated with the settlement request.

Step S62: The third-party settlement node receives acceptance opinions transmitted by the transaction participant nodes, the acceptance opinion being used for indicating a processing result of the settlement request by each of the transaction participant nodes;

Step S63: The third-party settlement node determines transaction consensus information according to the received acceptance opinions, and performs a third-party settlement according to the transaction consensus information, the transaction consensus information being used for indicating whether the transaction participant nodes reach a complete consensus on the settlement request.

In this embodiment of this application, after the third-party settlement node transmits the settlement request to the transaction participant nodes associated with the settlement request, the method further includes:
periodically initiating, for any transaction participant node, a query to the transaction participant node when the third-party settlement node does not receive, within a first preset duration, an acceptance opinion transmitted by the transaction participant node, until the acceptance opinion transmitted by the transaction participant node is received or a quantity of queries reaches a first preset threshold.

In this embodiment of this application, after the third-party settlement node receives the acceptance opinions transmitted by the transaction participant nodes and before the third-party settlement node determines the transaction consensus information according to the received acceptance opinions, the method further includes:

broadcasting, by the third-party settlement node for any transaction participant node, a received acceptance opinion of the transaction participant node, so that after receiving the acceptance opinion broadcasted by the third-party settlement node, another transaction participant node determines the transaction consensus information according to the received acceptance opinion and an acceptance opinion of the another transaction participant node.

In this embodiment of this application, after the third-party settlement node broadcasts the received acceptance opinion, the method further includes:

periodically forwarding the acceptance opinion to the another transaction participant node when the third-party settlement node does not receive, within a second preset duration, feedback information transmitted by the another transaction participant node, until the feedback information transmitted by the another transaction participant node is received or a quantity of forwarding times reaches a second preset threshold, the feedback information being used for indicating that the another transaction participant node receives the acceptance opinion broadcasted by the third-party settlement node.

In this embodiment of this application, the determining, by the third-party settlement node, transaction consensus information according to the received acceptance opinions includes:

determining that the transaction consensus information is a transaction success when the third-party settlement node receives the acceptance opinions of all the transaction participant nodes and all the acceptance opinions are allowing a transaction; or determining that the transaction consensus information is a transaction failure when the third-party settlement node receives the acceptance opinions of all the transaction participant nodes and at least one acceptance opinion is disallowing a transaction; or determining that the transaction consensus information is a transaction failure when the third-party settlement node does not receive an acceptance opinion of any transaction participant node.

Figure 7:
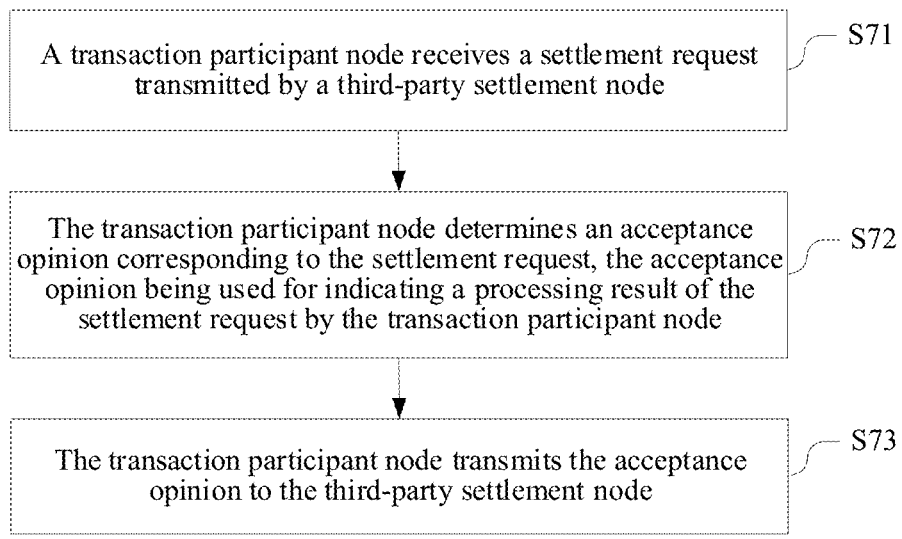
FIG. 7 is another optional schematic flowchart of a third-party settlement control method according to an embodiment of this application.

FIG. 7 is an implementation flowchart of another third-party settlement control method according to an embodiment of this application. A specific implementation process of the method includes the following steps.

Step S71: A transaction participant node receives a settlement request transmitted by a third-party settlement node, and records the settlement request.

Step S72: The transaction participant node determines an acceptance opinion corresponding to the settlement request, the acceptance opinion being used for indicating a processing result of the settlement request by the transaction participant node.

Step S73: The transaction participant node transmits the acceptance opinion to the third-party settlement node, so that the third-party settlement node determines transaction consensus information according to the acceptance opinion and performs a third-party settlement according to the transaction consensus information, the transaction consensus information being used for indicating whether transaction participant nodes reach a complete consensus on the settlement request.

In this embodiment of this application, that the transaction participant node determines an acceptance opinion corresponding to the settlement request includes:

determining, by the transaction participant node, the acceptance opinion corresponding to the settlement request according to a freezing result of a settlement amount corresponding to the settlement request when the transaction participant node is a payer node; or performing, by the transaction participant node, service logic verification on the transaction request according to a service rule corresponding to the settlement request when the transaction participant node is not a payer node, and determining the acceptance opinion of the settlement request according to a verification result.

In this embodiment of this application, after the transaction participant node transmits the acceptance opinion to the third-party settlement node, the method further includes:

receiving, by the transaction participant node, an acceptance opinion of another transaction participant node that is broadcasted by the third-party settlement node; and determining, by the transaction participant node, the transaction consensus information according to the received acceptance opinion and an acceptance opinion of the transaction participant node.

In this embodiment of this application, the receiving, by the transaction participant node, an acceptance opinion of another transaction participant node that is broadcasted by the third-party settlement node and the determining the transaction consensus information according to the received acceptance opinion and an acceptance opinion of the transaction participant node include:

determining that the transaction consensus information is a transaction success when the transaction participant node receives the acceptance opinion of the another transaction participant node and acceptance opinions of all transaction participant nodes are allowing a transaction; or determining that the transaction consensus information is a transaction failure when the transaction participant node receives the acceptance opinion of the another transaction participant node and an acceptance opinion of at least one transaction participant node is disallowing a transaction; or determining that the transaction consensus information is a transaction failure when the transaction participant node does not receive an acceptance opinion of any other transaction participant node.

In this embodiment of this application, after the receiving, by the transaction participant node, an acceptance opinion of another transaction participant node that is broadcasted by the third-party settlement node, the method further includes:

transmitting, by the transaction participant node, feedback information of the acceptance opinion to the third-party settlement node, the feedback information being used for indicating that the transaction participant node receives the acceptance opinion broadcasted by the third-party settlement node.

Figure 8:
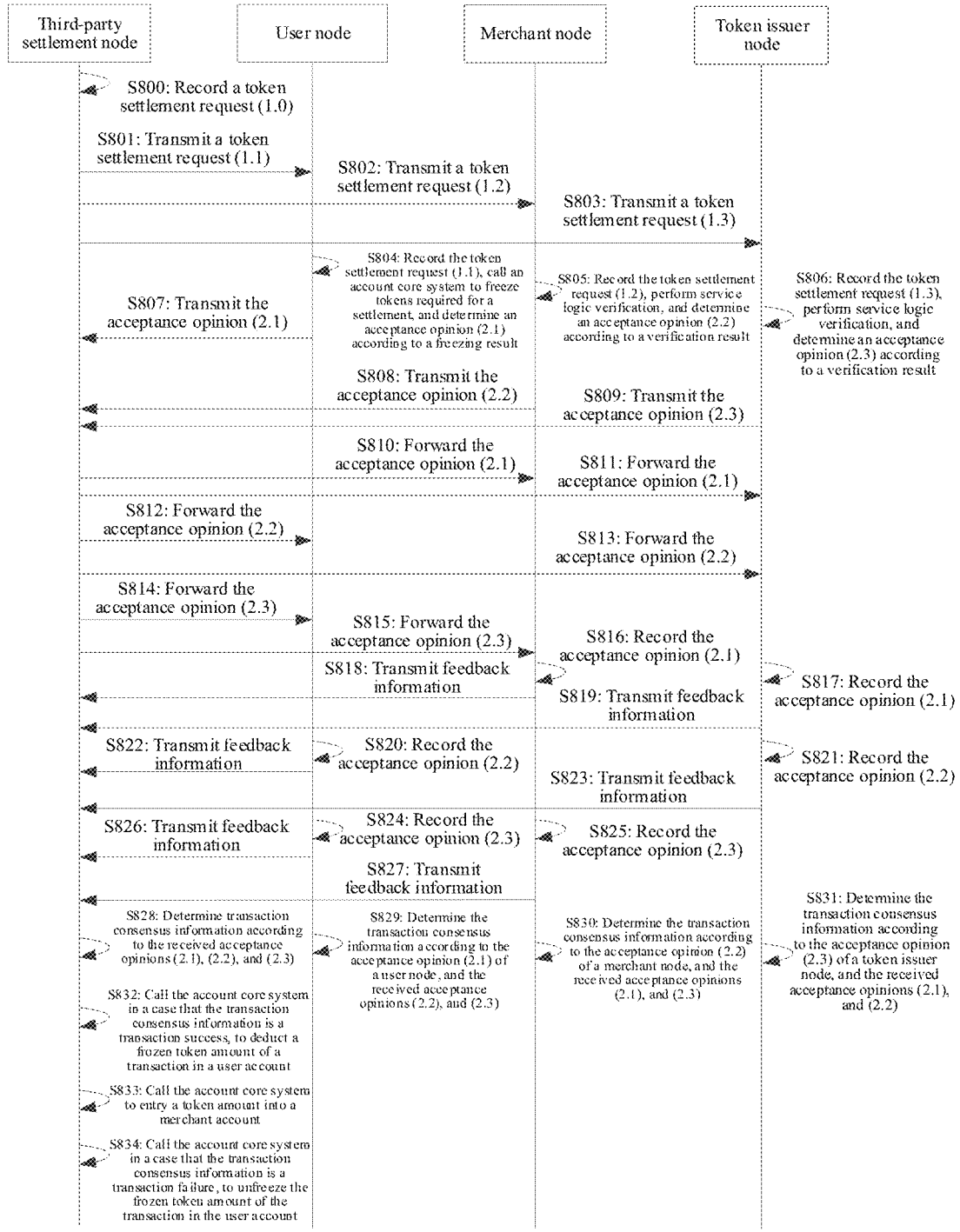
FIG. 8 is an optional schematic flowchart of an interaction implementation sequence according to an embodiment of this application.

FIG. 8 is an interaction sequence diagram of a third-party settlement. A specific implementation process of the method includes the following steps.

Step 800: A third-party settlement node records a token settlement request (also referred to as a token payment request) (1.0).

Step 801: The third-party settlement node transmits a token settlement request (1.1) to a user node.

Step 802: The third-party settlement node transmits a token settlement request (1.2) to a merchant node.

Step 803: The third-party settlement node transmits a token settlement request (1.3) to a token issuer node.

Step 804: The user node records the token settlement request (1.1), calls an account core system to freeze tokens required for a settlement, and determines an acceptance opinion (2.1) according to a freezing result.

Step 805: The merchant node records the token settlement request (1.2), performs service logic verification, and determines an acceptance opinion (2.2) according to a verification result;

Step 806: The token issuer node records the token settlement request (1.3), performs service logic verification, and determines an acceptance opinion (2.3) according to a verification result.

Step 807: The user node transmits the acceptance opinion (2.1) to the third-party settlement node.

Step 808: The merchant node transmits the acceptance opinion (2.2) to the third-party settlement node.

Step 809: The token issuer node transmits the acceptance opinion (2.3) to the third-party settlement node.

Step 810: The third-party settlement node forwards the acceptance opinion (2.1) to the merchant node.

Step 811: The third-party settlement node forwards the acceptance opinion (2.1) to the token issuer node.

Step 812: The third-party settlement node forwards the acceptance opinion (2.2) to the user node.

Step 813: The third-party settlement node forwards the acceptance opinion (2.2) to the token issuer node.

Step 814: The third-party settlement node forwards the acceptance opinion (2.3) to the user node.

Step 815: The third-party settlement node forwards the acceptance opinion (2.3) to the merchant node.

Step 816: The merchant node records the acceptance opinion (2.1).

Step 817: The token issuer node records the acceptance opinion (2.1).

Step 818: The merchant node transmits feedback information to the third-party settlement node.

Step 819: The token issuer node transmits feedback information to the third-party settlement node.

Step 820: The user node records the acceptance opinion (2.2).

Step 821: The token issuer node records the acceptance opinion (2.2).

Step 822: The user node transmits feedback information to the third-party settlement node.

Step 823: The token issuer node transmits feedback information to the third-party settlement node.

Step 824: The user node records the acceptance opinion (2.3).

Step 825: The merchant node records the acceptance opinion (2.3).

Step 826: The user node transmits feedback information to the third-party settlement node.

Step 827: The merchant node transmits feedback information to the third-party settlement node.

Step 828: The third-party settlement node determines transaction consensus information according to the received acceptance opinions (2.1), (2.2), and (2.3).

Step 829: The user node determines the transaction consensus information according to the acceptance opinion (2.1) of the user node, and the received acceptance opinions (2.2), and (2.3).

Step 830: The merchant node determines the transaction consensus information according to the acceptance opinion (2.2) of the merchant node, and the received acceptance opinions (2.1), and (2.3).

Step 831: The token issuer node determines the transaction consensus information according to the acceptance opinion (2.3) of the token issuer node, and the received acceptance opinions (2.1), and (2.2).

Step 832: The third-party settlement node calls the account core system when the transaction consensus information is a transaction success, to deduct a frozen token amount of a transaction in a user account.

Step 833: The third-party settlement node calls the account core system to entry a token amount into a merchant account.

Step 834: The third-party settlement node calls the account core system when the transaction consensus information is a transaction failure, to unfreeze the frozen token amount of the transaction in the user account.

Steps 801 to 803 are not differentiated in detail in a time sequence. The third-party settlement node transmits the token settlement request to the user node, the merchant node, and the token issuer node in parallel. Similarly, steps 804 to 806 are also not differentiated in detail in a time sequence, and steps 807 to 809, steps 810 to 815, and step 816 and step 817 are also not differentiated in detail in a time sequence. Step 818 and step 819, step 820 and step 821, step 822 and step 823, step 824 and step 825, and step 826 and step 827 are also similar. Steps 828 to 831 are not differentiated in detail in a time sequence, and are specifically determined according to an actual situation.

Step 832 and step 833 are processes when the transaction consensus information is a transaction success. Step 834 is a process when the transaction consensus information is a transaction failure.

Figure 9:
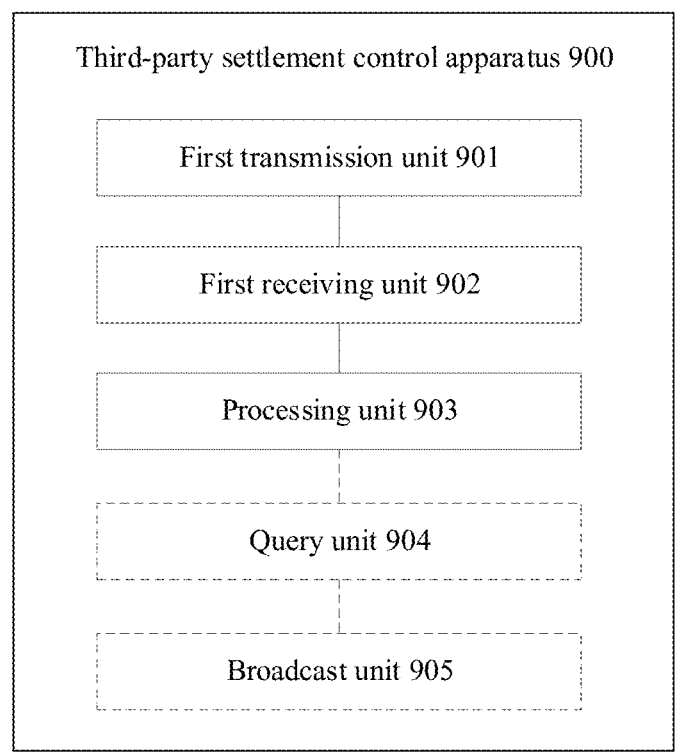
FIG. 9 is the first optional block diagram of a third-party settlement control apparatus according to an embodiment of this application.

FIG. 9 is a schematic structural diagram of a third-party settlement control apparatus 900 according to an embodiment of this application. The apparatus 900 may include:
- a first transmission unit 901, configured to respond to a settlement request, and transmit the settlement request to transaction participant nodes associated with the settlement request;
- a first receiving unit 902, configured to receive acceptance opinions transmitted by the transaction participant nodes, the acceptance opinion being used for indicating a processing result of the settlement request by each of the transaction participant nodes; and
- a processing unit 903, configured to determine transaction consensus information according to the received acceptance opinions, and perform a third-party settlement according to the transaction consensus information, the transaction consensus information being used for indicating whether the transaction participant nodes reach a complete consensus on the settlement request.

In this embodiment of this application, the apparatus further includes a query unit 904.

The query unit 904 is configured to periodically initiate, for any transaction participant node after the first transmission unit 901 transmits the settlement request to the transaction participant nodes associated with the settlement request, a query to the transaction participant node when the query unit does not receive, within a first preset duration, an acceptance opinion transmitted by the transaction participant node, until the acceptance opinion transmitted by the transaction participant node is received or a quantity of queries reaches a first preset threshold.

In this embodiment of this application, the apparatus further includes a broadcast unit 905.

The broadcast unit 905 is configured to broadcast, for any transaction participant node after the first receiving unit 901 receives the acceptance opinions transmitted by the transaction participant nodes and before the processing unit 903 determines the transaction consensus information according to the received acceptance opinions, a received acceptance opinion of the transaction participant node, so that after receiving the acceptance opinion broadcasted by the third-party settlement node, another transaction participant node determines the transaction consensus information according to the received acceptance opinion and an acceptance opinion of the another transaction participant node.

In this embodiment of this application, the broadcast unit 905 is further configured to:

periodically forward the acceptance opinion to the another transaction participant node when the broadcast unit does not receive, within a second preset duration after broadcasting the received acceptance opinion, feedback information transmitted by the another transaction participant node, until the feedback information transmitted by the another transaction participant node is received or a quantity of forwarding times reaches a second preset threshold, the feedback information being used for indicating that the another transaction participant node receives the acceptance opinion broadcasted by the broadcast unit.

In this embodiment of this application, the processing unit 903 is specifically configured to:

determine that the transaction consensus information is a transaction success when the acceptance opinions of all the transaction participant nodes are received and all the acceptance opinions are allowing a transaction; or determine that the transaction consensus information is a transaction failure when the acceptance opinions of all the transaction participant nodes are received and at least one acceptance opinion is disallowing a transaction; or determine that the transaction consensus information is a transaction failure when an acceptance opinion of any transaction participant node is not received.

Figure 10:
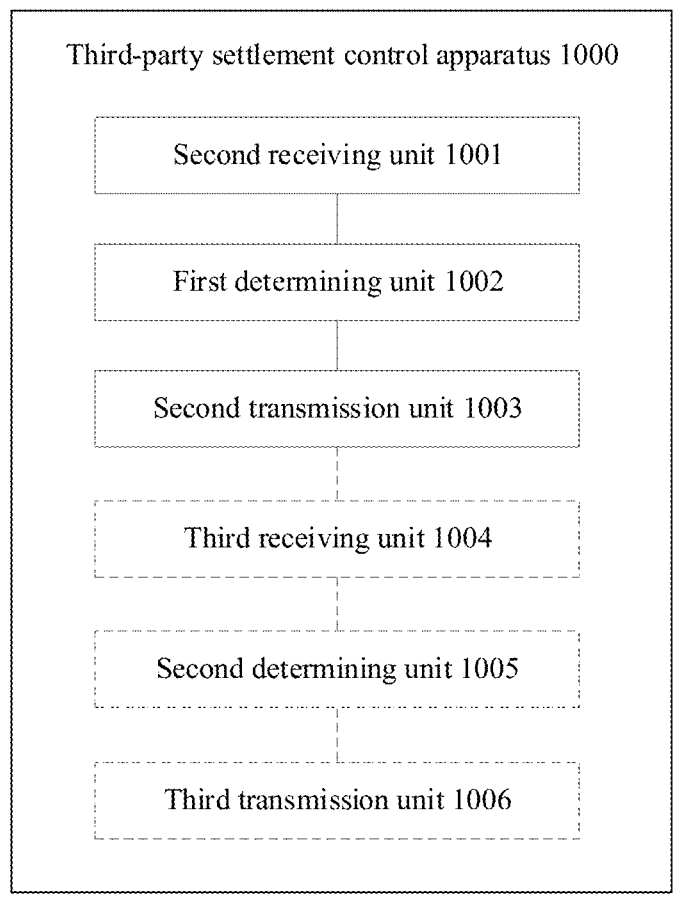
FIG. 10 is the second optional block diagram of a third-party settlement control apparatus according to an embodiment of this application.

FIG. 10 is a schematic structural diagram of another third-party settlement control apparatus 1000 according to an embodiment of this application. The apparatus 1000 may include:

a second receiving unit 1001, configured to receive a settlement request transmitted by a third-party settlement node;

a first determining unit 1002, configured to determine an acceptance opinion corresponding to the settlement request, the acceptance opinion being used for indicating a processing result of the settlement request by a transaction participant node; and a second transmission unit 1003, configured to transmit the acceptance opinion to the third-party settlement node, so that the third-party settlement node determines transaction consensus information according to the acceptance opinion and performs a third-party settlement according to the transaction consensus information, the transaction consensus information being used for indicating whether transaction participant nodes reach a complete consensus on the settlement request.

In this embodiment of this application, the first determining unit 1002 is specifically configured to:

determine the acceptance opinion corresponding to the settlement request according to a freezing result of a settlement amount corresponding to the settlement request when the transaction participant node is a payer node; or perform service logic verification on the transaction request according to a service rule corresponding to the settlement request when the transaction participant node is not a payer node, and determine the acceptance opinion of the settlement request according to a verification result.

In this embodiment of this application, the apparatus further includes a third receiving unit 1004 and a second determining unit 1005.

The third receiving unit 1004 is configured to receive, after the second transmission unit transmits the acceptance opinion to the third-party settlement node, the acceptance opinion of the another transaction participant node that is broadcasted by the third-party settlement node.

The second determining unit 1005 is configured to determine the transaction consensus information according to the received acceptance opinion and an acceptance opinion of the transaction participant node.

In this embodiment of this application, the first determining unit 1002 is specifically configured to:

determine that the transaction consensus information is a transaction success when the acceptance opinion of the another transaction participant node is received and acceptance opinions of all transaction participant nodes are allowing a transaction; or determine that the transaction consensus information is a transaction failure when the acceptance opinion of the another transaction participant node is received and an acceptance opinion of at least one transaction participant node is disallowing a transaction; or determine that the transaction consensus information is a transaction failure when an acceptance opinion of any other transaction participant node is not received.

In this embodiment of this application, the apparatus further includes a third transmission unit 1006.

The third transmission unit 1006 is configured to transmit, after the third receiving unit 1004 receives the acceptance opinion of the another transaction participant node that is broadcasted by the third-party settlement node, feedback information of the acceptance opinion to the third-party settlement node, the feedback information being used for indicating that the transaction participant node receives the acceptance opinion broadcasted by the third-party settlement node.

Because the third-party settlement node in this application serves as a hub for a data exchange, and transmits the settlement request in parallel to the transaction participant nodes, and the transaction participant nodes perform parallel computing, thereby improving the efficiency of a third-party settlement. Specifically, according to a third-party settlement control method and apparatus, an electronic device, and a storage medium provided in the embodiments of this application, a third-party settlement node is used as a hub for a data exchange to establish a point-to-point communication network between the third-party settlement node and each transaction participant node. The third-party settlement node transmits a settlement request to transaction participant nodes involved in a transaction, and the transaction participant nodes perform parallel computing when processing sub-transactions, thereby improving system processing efficiency. In addition, the third-party settlement node collects acceptance opinions of the transaction participant nodes, and determines, according to the received acceptance opinions of the transaction participant nodes, whether a complete consensus is reached. Only when all the acceptance opinions are approving the transaction, the third-party settlement node considers a complete consensus is reached on the transaction, and performs a funds change and clearing and settlement services accordingly. It is ensured that ledger data of all the transaction participant nodes is consistent, and a ledger of any party can trace all data of a recorded transaction, and a transaction acceptance process is more efficient, clear, open, and traceable.

For ease of description, the foregoing components are respectively described as various modules (or units) divided according to functions. Certainly, during the implementation of this application, functions of the various modules (or units) may be implemented in the same piece of or a plurality of pieces of software or hardware.

After the third-party settlement control method and apparatus in exemplary implementations of this application are described, next, the following describes a third-party settlement control apparatus according to another exemplary implementation of this application.

A person skilled in the art can understand that various aspects of this application may be implemented as systems, methods, or computer program products. Therefore, each aspect of this application may be specifically implemented in the following forms, that is, the implementation form of complete hardware, complete software (including firmware and micro code), or a combination of hardware and software, which may be uniformly referred to as "circuit", "module", or "system" herein corresponding to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

In some possible implementations, the third-party settlement control apparatus according to this application may include at least one processor and one memory. The memory stores program code, the program code, when executed by the processor, causing the processor to perform the steps in any one of the third-party settlement control methods described according to various exemplary implementations of this application in this specification. For example, the processor may perform the steps shown in FIG. 6.

Actions performed by the third-party settlement control apparatus of this implementation are similar to those of the third-party settlement control apparatus shown in FIG. 9, and details are not described herein again.

In some possible implementations, the computing apparatus according to this application may include at least one processor and at least one memory. The memory stores program code, the program code, when executed by the processor, causing the processor to perform the steps in any one of the third-party settlement control methods described according to various exemplary implementations of this application in this specification. For example, the processor may perform the steps shown in FIG. 6.

Actions performed by the third-party settlement control apparatus of this implementation are similar to those of the third-party settlement control apparatus shown in FIG. 9, and details are not described herein again.

In some possible implementations, the embodiments of this application further provide an electronic device, including a processor and a memory, the memory storing program code, the program code, when executed by the processor, causing the processor to perform steps of the first third-party settlement control method.

In some possible implementations, the embodiments of this application further provide an electronic device, including a processor and a memory, the memory storing program code, the program code, when executed by the processor, causing the processor to perform steps of the second third-party settlement control method.

In some possible implementations, the embodiments of this application further provide a non-transitory computer-readable storage medium, including program code, the program code, when running on an electronic device, being used for causing the electronic device to perform steps of any one of the third-party settlement control methods in the foregoing embodiments.

A computing apparatus 110 according to an implementation of this application is described below with reference to FIG. 11. The computing apparatus 110 shown in FIG. 11 is only an example, and does not impose any restriction on functions and scopes of use of the embodiments of this application.

Figure 11:
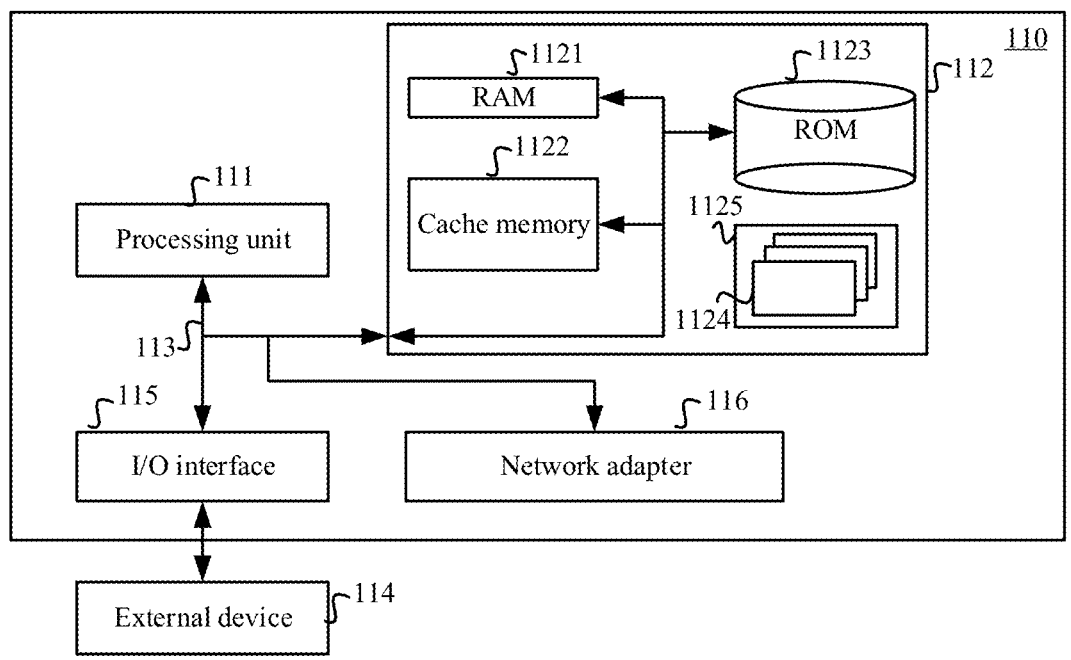
FIG. 11 is a schematic diagram of compositional structures of hardware of a computing apparatus to which the embodiments of this application are applied.

As shown in FIG. 11, the computing apparatus 110 is shown in the form of a general computing apparatus. Components of the computing apparatus 110 may include, but are not limited to, at least one processing unit 111, at least one storage unit 112, and a bus 113 connected to different system components (including the storage unit 112 and the processing unit 111).

The bus 113 represents one or more of several types of bus structures, including a memory bus or a memory controller, a peripheral bus, a processor, or a local bus using any bus structure among various bus structures.

The storage unit 112 may include a readable medium in the form of a volatile memory, such as a random access memory (RAM) 1121 and/or a cache memory 1122, and may further include a read-only memory (ROM) 1123. The storage unit 112 may further include a non-transitory computer-readable storage medium in the form of a non-transitory memory.

The storage unit 112 may further include a program/utility 1125 having a set of (at least one) program modules 1124. Such a program module 1124 includes, but is not limited to, an operating system, one or more applications, other program modules, and program data. Each or a combination of these examples may include implementation of a network environment.

The computing apparatus 110 may further communicate with one or more external devices 114 (such as a keyboard, a pointing device), and may further communicate with one or more devices that enable a user to interact with the computing apparatus 110, and/or any device (such as a network card or a modem) that enables the computing apparatus 110 to communicate with one or more other computing apparatuses. Such communication may be performed by using an input/output (I/O) interface 115. In addition, the computing apparatus 110 may further communicate with one or more networks, such as a local area network (LAN), a wide area network (WAN), and/or a public network, (such as the Internet) by using a network adapter 116. As shown in the figure, the network adapter 116 communicates with other modules configured to the computing apparatus 110 by using the bus 113. It is to be understood that, although not shown in the figure, other hardware and/or software modules may be used in combination with the computing apparatus 110, including, but not limited to: micro code, a device driver, a redundancy processor, an external disk drive array, a RAID system, a tape drive, a data backup storage system, and the like.

In some possible implementations, each aspect of the third-party settlement control method provided in this application may be further implemented in a form of a program product including program code. When the program product runs on a computer device, the program code is used to enable the computer device to perform steps of the third-party settlement control method according to various exemplary implementations of this application described above in this specification. For example, the computer device can perform the steps shown in FIG. 6.

The program product may use any combination of one or more readable media.

The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The program product of a third-party settlement according to an implementation of this application may use a portable CD-ROM, include program code, and may be run on the computing apparatus. However, the program product of this application is not limited to this. In this specification, the readable storage medium may be any tangible medium including or storing a program, and the program may be used by or in combination with a command execution system, apparatus, or device.

The readable signal medium may include a data signal propagated in a baseband or as part of a carrier, and stores computer-readable program code. A data signal propagated in such a way may be in a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with a command execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

The program code for executing the operations of this application may be written by using any combination of one or more programming languages. The programming languages include an object-oriented programming language such as Java and C++, and also include a conventional procedural programming language such as "C" or similar programming languages. The program code may be completely executed on a user computing apparatus, partially executed on user equipment, executed as an independent software package, partially executed on a user computing apparatus and partially executed on a remote computing apparatus, or completely executed on a remote computing apparatus or server. For the case involving a remote computing apparatus, the remote computing apparatus may be connected to a user computing apparatus by using any type of network including a LAN or a WAN, or may be connected to an external computing apparatus (for example, through the Internet by using an Internet service provider).

Although several units or subunits of the apparatus are mentioned in detailed description above, such division is merely an example but not mandatory. In fact, according to the implementations of this application, features and functions of two or more units described above may be specified in one unit. On the contrary, the features or functions of one unit described above may further be divided and specified by a plurality of units.

In addition, although the operations of the method in this application are described in a specific order in the accompanying drawings. This does not require or imply that the operations have to be performed in the specific order, or all the operations shown have to be performed to achieve an expected result. Additionally or alternatively, some steps may be omitted, and a plurality of steps are combined into one step to be performed, and/or one step is divided into a plurality of steps to be performed.

A person skilled in the art is to understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to the embodiments of this application. It is to be understood that computer program commands can implement each procedure and/or block in the flowcharts and/or block diagrams and a combination of procedures and/or blocks in the flowcharts and/or block diagrams. These computer program commands may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using commands executed by the computer or the processor of another programmable data processing device.

These computer program commands may alternatively be stored in a computer-readable memory that can instruct a computer or another programmable data processing device to work in a specific manner, so that the commands stored in the computer-readable memory generate an artifact that includes a command apparatus. The command apparatus implements a specific function in one or more procedures in the flowcharts and/or in one or more blocks in the block diagrams.

These computer program commands may further be loaded onto a computer or another programmable data processing device, so that a series of operations and steps are performed on the computer or the another programmable device, thereby generating computer-implemented processing. Therefore, the commands executed on the computer or the another programmable device provide steps for implementing a specific function in one or more processes in the flowcharts and/or in one or more blocks in the block diagrams.

Although preferred embodiments of this specification have been described, once a person skilled in the art learns of the basic creative concept, additional changes and modifications may be made to the embodiments. Therefore, the following claims are intended to be construed as to cover the exemplary embodiments and all changes and modifications falling within the scope of this application.

Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A third-party settlement control method performed by a third-party settlement node that is communicatively connected to multiple transaction participant nodes, the method comprising:
    responding, by the third-party settlement node, to a settlement request requesting a transaction from a first one of the transaction participant nodes, and transmitting the settlement request to the transaction participant nodes associated with the settlement request including the first one of the transaction participant nodes;
    periodically initiating, by the third-party settlement node and for any transaction participant node, a query to the transaction participant node when the third-party settlement node does not receive, within a first preset duration, an acceptance opinion transmitted by the transaction participant node, until the acceptance opinion transmitted by the transaction participant node is received or a quantity of queries reaches a first preset threshold;
    receiving, by the third-party settlement node, acceptance opinions transmitted by the transaction participant nodes including the first one of the transaction participant nodes, the acceptance opinions being used for indicating a processing result of the settlement request by each of the transaction participant nodes;
    determining, by the third-party settlement node, transaction consensus information according to the received acceptance opinions, the transaction consensus information being used for indicating whether the transaction participant nodes including the first one of the transaction participant nodes reach a complete consensus on the settlement request; and
    in response to a determination that the transaction consensus information indicates that the acceptance opinion of each of the transaction participant nodes allows the transaction, determining that the transaction participant nodes including the first one of the transaction participant nodes reach a complete consensus on the settlement request and performing the transaction requested by the settlement request.

2. The method according to claim 1, wherein after the third-party settlement node receives the acceptance opinions transmitted by the transaction participant nodes and before the third-party settlement node determines the transaction consensus information according to the received acceptance opinions, the method further comprises:
    broadcasting, by the third-party settlement node and for any transaction participant node, a received acceptance opinion of the transaction participant node, so that after receiving the acceptance opinion broadcasted by the third-party settlement node, another transaction participant node determines the transaction consensus information according to the received acceptance opinion and an acceptance opinion of the another transaction participant node.

3. The method according to claim 2, wherein after the third-party settlement node broadcasts the received acceptance opinion, the method further comprises:
    periodically forwarding, by the third-party settlement node, the acceptance opinion to the another transaction participant node when the third-party settlement node does not receive, within a second preset duration, feedback information transmitted by the another transaction participant node, until the feedback information transmitted by the another transaction participant node is received or a quantity of forwarding times reaches a second preset threshold, the feedback information being used for indicating that the another transaction participant node receives the acceptance opinion broadcasted by the third-party settlement node.

4. The method according to claim 1, wherein the method further comprises:
    in response to a determination that the transaction consensus information indicates that (i) at least one acceptance opinion from a respective one of the transaction participant nodes disallows the transaction; or (ii) the third-party settlement node does not receive an acceptance opinion of any transaction participant node, determining that the transaction participant nodes including the first one of the transaction participant nodes do not reach a complete consensus on the settlement request and aborting the transaction requested by the settlement request.

5. An electronic device acting as a third-party settlement node for performing a third-party settlement control method, comprising a processor and a memory, the memory storing a plurality of computer programs, the plurality of computer programs, when executed by the processor, causing the electronic device to perform a plurality of operations including:
    responding, by the third-party settlement node, to a settlement request requesting a transaction from a first one of multiple transaction participant nodes, and transmitting the settlement request to the multiple transaction participant nodes associated with the settlement request including the first one of the transaction participant nodes;
    periodically initiating, by the third-party settlement node and for any transaction participant node, a query to the transaction participant node when the third-party settlement node does not receive, within a first preset duration, an acceptance opinion transmitted by the transaction participant node, until the acceptance opinion transmitted by the transaction participant node is received or a quantity of queries reaches a first preset threshold;
    receiving, by the third-party settlement node, acceptance opinions transmitted by the transaction participant nodes including the first one of the transaction participant nodes, the acceptance opinions being used for indicating a processing result of the settlement request by each of the transaction participant nodes;
    determining, by the third-party settlement node, transaction consensus information according to the received acceptance opinions, the transaction consensus information being used for indicating whether the transaction participant nodes including the first one of the transaction participant nodes reach a complete consensus on the settlement request; and in response to a determination that the transaction consensus information indicates that the acceptance opinion of each of the transaction participant nodes allows the transaction, determining that the transaction participant nodes including the first one of the transaction participant nodes reach a complete consensus on the settlement request and performing the transaction requested by the settlement request.

6. The electronic device according to claim 5, wherein, after the third-party settlement node receives the acceptance opinions transmitted by the transaction participant nodes and before the third-party settlement node determines the transaction consensus information according to the received acceptance opinions, the plurality of operations further comprise:

broadcasting, by the third-party settlement node and for any transaction participant node, a received acceptance opinion of the transaction participant node, so that after receiving the acceptance opinion broadcasted by the third-party settlement node, another transaction participant node determines the transaction consensus information according to the received acceptance opinion and an acceptance opinion of the another transaction participant node.

7. The electronic device according to claim 6, wherein after the third-party settlement node broadcasts the received acceptance opinion, the plurality of operations further comprise:

periodically forwarding, by the third-party settlement node, the acceptance opinion to the another transaction participant node when the third-party settlement node does not receive, within a second preset duration, feedback information transmitted by the another transaction participant node, until the feedback information transmitted by the another transaction participant node is received or a quantity of forwarding times reaches a second preset threshold, the feedback information being used for indicating that the another transaction participant node receives the acceptance opinion broadcasted by the third-party settlement node.

8. The electronic device according to claim 5, wherein the plurality of operations further comprises:

in response to a determination that the transaction consensus information indicates that (i) at least one acceptance opinion disallows the transaction; or (ii) the third-party settlement node does not receive an acceptance opinion of any transaction participant node, determining that the transaction participant nodes including the first one of the transaction participant nodes do not reach a complete consensus on the settlement request and aborting the transaction requested by the settlement request.

9. A non-transitory computer-readable storage medium, comprising a plurality of computer programs, the plurality of computer programs, when executed by a processor of an electronic device acting as a third-party settlement node, causing the electronic device to perform a plurality of operations including:

responding, by the third-party settlement node, to a settlement request requesting a transaction from a first one of multiple transaction participant nodes, and transmitting the settlement request to the multiple transaction participant nodes associated with the settlement request including the first one of the transaction participant nodes;

periodically initiating, by the third-party settlement node and for any transaction participant node, a query to the transaction participant node when the third-party settlement node does not receive, within a first preset duration, an acceptance opinion transmitted by the transaction participant node, until the acceptance opinion transmitted by the transaction participant node is received or a quantity of queries reaches a first preset threshold;

receiving, by the third-party settlement node, acceptance opinions transmitted by the transaction participant nodes including the first one of the transaction participant nodes, the acceptance opinions being used for indicating a processing result of the settlement request by each of the transaction participant nodes;

determining, by the third-party settlement node, transaction consensus information according to the received acceptance opinions, the transaction consensus information being used for indicating whether the transaction participant nodes including the first one of the transaction participant nodes reach a complete consensus on the settlement request; and in response to a determination that the transaction consensus information indicates that the acceptance opinion of each of the transaction participant nodes allows the transaction, determining that the transaction participant nodes including the first one of the transaction participant nodes reach a complete consensus on the settlement request and performing the transaction requested by the settlement request.

10. The non-transitory computer-readable storage medium according to claim 9, wherein, after the third-party settlement node receives the acceptance opinions transmitted by the transaction participant nodes and before the third-party settlement node determines the transaction consensus information according to the received acceptance opinions, the plurality of operations further comprise:

broadcasting, by the third-party settlement node and for any transaction participant node, a received acceptance opinion of the transaction participant node, so that after receiving the acceptance opinion broadcasted by the third-party settlement node, another transaction participant node determines the transaction consensus information according to the received acceptance opinion and an acceptance opinion of the another transaction participant node.

11. The non-transitory computer-readable storage medium according to claim 10, wherein after the third-party settlement node broadcasts the received acceptance opinion, the plurality of operations further comprise:

periodically forwarding, by the third-party settlement node, the acceptance opinion to the another transaction participant node when the third-party settlement node does not receive, within a second preset duration, feedback information transmitted by the another transaction participant node, until the feedback information transmitted by the another transaction participant node is received or a quantity of forwarding times reaches a second preset threshold, the feedback information being used for indicating that the another transaction participant node receives the acceptance opinion broadcasted by the third-party settlement node.

12. The non-transitory computer-readable storage medium according to claim 9, wherein the the plurality of operations further comprises:

in response to a determination that the transaction consensus information indicates that (i) at least one acceptance opinion from a respective one of the transaction participant nodes disallows the transaction; or (ii) the third-party settlement node does not receive an acceptance opinion of any transaction participant node, determining that the transaction participant nodes including the first one of the transaction participant nodes do not reach a complete consensus on the settlement request and aborting the transaction requested by the settlement request.

\* \* \* \* \*